(12) United States Patent
Coppola

(10) Patent No.: US 7,610,872 B2
(45) Date of Patent: Nov. 3, 2009

(54) TASTING GLASSES HAVING REVEALABLE INDICATORS THERE ON AND METHOD OF CONDUCTING BLIND TASTE TEST

(76) Inventor: Roman Coppola, 6740 Milner Rd., Los Angeles, CA (US) 90068

(*) Notice: Subject to any disclaimer, the term of this patent is extended or adjusted under 35 U.S.C. 154(b) by 1041 days.

(21) Appl. No.: 11/100,745

(22) Filed: Apr. 7, 2005

(65) Prior Publication Data

US 2006/0225637 A1    Oct. 12, 2006

(51) Int. Cl.
G09F 23/08 (2006.01)
(52) U.S. Cl. ................ 116/200; 215/374; 40/324
(58) Field of Classification Search ........... 116/200; 215/374; 220/600; 40/324, 326, 310; 428/195.1, 428/34.1
See application file for complete search history.

(56) References Cited

U.S. PATENT DOCUMENTS

| | | | | |
|---|---|---|---|---|
| 2,119,546 A | * | 6/1938 | Knaggs | 427/269 |
| D140,658 S | * | 3/1945 | Erbe | D7/523 |
| 3,657,085 A | * | 4/1972 | Hoffmeister et al. | 204/157.41 |
| 3,874,977 A | * | 4/1975 | Pyles | 40/324 |
| 4,040,893 A | * | 8/1977 | Ghezzo | 216/47 |
| 4,855,176 A | * | 8/1989 | Ohwaki et al. | 428/195.1 |
| D307,089 S | * | 4/1990 | Lage | D7/536 |
| 5,206,496 A | * | 4/1993 | Clement et al. | 250/271 |
| 5,282,917 A | * | 2/1994 | Danelski | 156/277 |
| 5,313,193 A | * | 5/1994 | Dubois et al. | 340/572.1 |
| 5,767,483 A | * | 6/1998 | Cameron et al. | 219/121.85 |
| 5,899,515 A | * | 5/1999 | Burns | 294/159 |
| 6,189,715 B1 | * | 2/2001 | Dubois | 215/374 |
| D438,430 S | * | 3/2001 | Gabrhel | D7/523 |
| 6,479,102 B1 | * | 11/2002 | Hunter et al. | 427/256 |
| 6,520,543 B1 | * | 2/2003 | Hoar | 283/67 |
| D488,673 S | * | 4/2004 | Farce | D7/523 |
| 6,741,150 B2 | * | 5/2004 | Holmes et al. | 335/207 |
| 6,905,725 B2 | * | 6/2005 | Dykhne et al. | 427/7 |
| 6,979,120 B1 | * | 12/2005 | Wolfe | 374/162 |
| 7,048,971 B2 | * | 5/2006 | Arora | 427/402 |

(Continued)

FOREIGN PATENT DOCUMENTS

DE    10359002 A1 * 7/2005

(Continued)

OTHER PUBLICATIONS

Derwent Abstract 1998-179889, inventor Wagner, Abstract of BR 9600451 A, published Mar. 3, 1998, title "Food or Drink Containers heat sensitive illustration system based on application of pigments and thermochemical chromatisation reaction".*

(Continued)

Primary Examiner—R. A. Smith
Assistant Examiner—Tania C Courson
(74) Attorney, Agent, or Firm—McDonnell Boehnen Hulbert & Berghoff LLP

(57) ABSTRACT

A kit and method of blind comparison utilizing glass objects, each having a unique revealable indicator on the surface of the glass. The revealable indicator is created by a shallow etching into the exterior surface of the tasting glass such that the indicator is substantially invisible to the human eye under normal conditions, but becomes visible when condensation forms on the outer surface of the glass.

8 Claims, 1 Drawing Sheet

U.S. PATENT DOCUMENTS

| | | | |
|---|---|---|---|
| 7,253,422 B2 * | 8/2007 | Smith | 250/492.1 |
| 7,284,396 B2 * | 10/2007 | Barron et al. | 63/32 |
| 7,468,786 B2 * | 12/2008 | Wagner et al. | 356/30 |
| 2003/0189055 A1 * | 10/2003 | Thinnes | 220/630 |
| 2004/0037448 A1 * | 2/2004 | Brundage | 382/100 |
| 2006/0016109 A1 * | 1/2006 | Nicolaas | 40/542 |
| 2007/0048503 A1 * | 3/2007 | MacDonald et al. | 428/195.1 |
| 2007/0062961 A1 * | 3/2007 | Rigas | 220/703 |
| 2007/0207623 A1 * | 9/2007 | Hiroki | 438/745 |
| 2008/0014313 A1 * | 1/2008 | Squicciarini | 426/106 |
| 2008/0128429 A1 * | 6/2008 | Towery et al. | 220/574 |
| 2009/0026167 A1 * | 1/2009 | Metry | 215/386 |

FOREIGN PATENT DOCUMENTS

| | | | |
|---|---|---|---|
| GB | 2341136 A | * | 3/2000 |
| GB | 2392293 A | * | 2/2004 |
| JP | 2005099159 A | * | 4/2005 |

OTHER PUBLICATIONS

Derwent Abstract 2001-082170, Abstract of DE20014776 U1, published Dec. 21, 2000, title "Numbered marker for wine tasting glasses comprises a number and a device for attaching to the edge of a glass".*

Derwent Abstract 2004-612360, inventor Holtermans, Abstract of NL 1022006 C2, published May 28, 2004, title "Stirrer for e.g. drinks, provided with information only visible when stirrer is contacted with liquid".*

Derwent Abstract 2003-628929, Abstract of DE 20307858 U1, published Aug. 7, 2003, title "Wine Tasting device for blind tasting comprises showing contents but covered by removable cover".*

Hopkins, Albert A.,"Magic Stage Illusions and Scientific Diversions Including Trick Photography", Arno Press, pp. 410-412, 1977.

* cited by examiner

TASTING GLASSES HAVING REVEALABLE INDICATORS THERE ON AND METHOD OF CONDUCTING BLIND TASTE TEST

FIELD OF THE INVENTION

The present invention relates to the field of beverage glasses, specifically beverage glasses for use in a beverage tasting event.

BACKGROUND OF THE INVENTION

A wine tasting is a gathering of people to taste and compare different wines. Although wine tasting has been a common practice for many years for the experienced wine connoisseur, it recent years it has gained increased popularity among the novice wine drinker as well.

While a wine tasting may be performed in many different ways, a typical blind wine tasting includes two necessary items for each participant. First, each participant needs a set of wine glasses—one for each bottle of wine to be sampled. Second, each participant needs a wine placemat. Typically, the wine placemat has a six numbered circles on it, corresponding to each of the labeled bottles of wine, designating the placement of each wine glass. Although the wine bottles themselves are usually covered in order to conceal their identity from the participants, the participant is always aware of which numbered wine bottle they are sampling at the time.

Similarly, blind comparisons of other beverages, food and other products, have been conducted and are of continuing interest. The present inventor has conceived of a new method of conducting such blind comparisons in which the product to be compared, e.g., wine, is contained in a glass container.

SUMMARY OF THE INVENTION

The present invention comprises a kit and a method for conducting blind comparisons of products.

In one aspect, the present invention comprises a kit of two or more glass objects, preferably glass containers, each object having thereon a unique (relative to the other glass object(s) in the kit) revealable indicator. In a preferred embodiment of this aspect of the invention, the kit comprises a set of two or more tasting glasses wherein each tasting glass has a unique revealable indicator. The difference between the revealable indicators on each of the glass objects of the kit cannot be determined under the conditions in which the glass objects are used to compare two or more products as described hereinbelow, but is revealable by changing the local conditions of the revealable indicator (e.g., by applying moisture).

In a second aspect, the invention comprises a method of conducting a blind comparison of products using the kit according to the first aspect. The method according to this aspect of the invention comprises:

a) associating a sample of each of at least two products with a glass object of the kit;

b) secretly recording, mentally or otherwise, the correspondence between identity of the revealable indicator on each of the glass objects and the product associated with it;

c) permitting one not privy to the secret correspondence to compare the products;

d) revealing the identity of at least one of the revealable indicators, and e) identifying the product(s) using the correspondence between the products and the revealable indicators.

In a preferred embodiment the glass objects are wine glasses and the products are wines.

DETAILED DESCRIPTION OF THE PREFERRED EMBODIMENTS

The kit and method of blind comparison of the present invention, as described above, can comprise any sort of glass object. All that is necessary in the method of the invention is that there is a one-to-one correspondence between the glass objects having unique revealable indicators thereon and the product(s) being subject to comparison with each other. As used herein, the term "revealable indicator" is a symbol that is undetectable to the observer under the conditions in which the product comparison is to be conducted but which can be revealed subsequent to the comparison of the products in some way, such as by applying moisture (as in breathing on the glass object in the location of the revealable indicator). In some embodiments of the invention the products being compared may appear substantially similar (e.g., different brands of the same type of wine (chardonnays, merlots, cabernets, etc.)). The products need not have a similar appearance, however, if their identity cannot be determined by observation of one comparing the products.

In the method of the invention each of two or more products is associated with each of two or more glass objects of a kit of the invention. Such association can be made by placing each product nearer to one glass object than to all others, such as by placing the products next to a glass object, on the glass object, or in the glass object (e.g., when the glass object is a container like a wine glass). In the method of the invention, one party determines the identity of each revealable indicator on each glass object and records (mentally or otherwise) which product it is associated with. A second party not privy to the correspondence between the revealable indicators and products then compares the products. After the comparison, the first party reveals the revealable indicators and the correspondence of least one (and preferably all) of the revealable indicators and the products.

In a preferred embodiment, the glass object is a glass (also called herein a "tasting glass") and the products to be compared are wines. The following describes the tasting glasses and their use in the method of the invention to compare beverages. Those of skill in the art will appreciate from the following, however, how other glass objects may be used and/or products compared in a similar manner. For example, rather then pouring a beverage into a tasting glass as described below, one may place a sample of a solid food (e.g., cheese) on a glass block or plate having a revealable indicator thereon.

Figure 1:
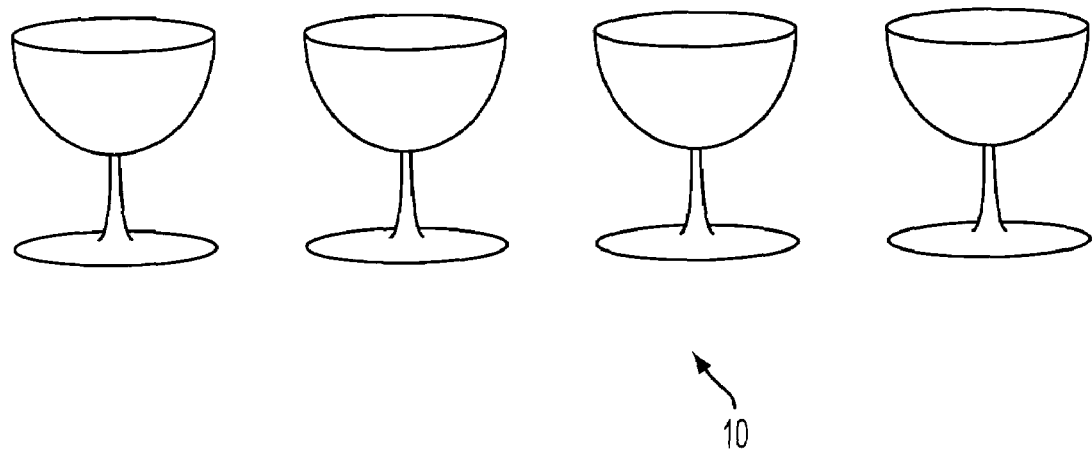
FIG. 1 is a tasting set with revealable indicators not visible.

The tasting glasses of the present invention each have a unique revealable indicator on the surface of the glass. The tasting glasses are used in sets of two or more glasses 10. Preferably the tasting glasses are used in sets of four to six glasses, as shown in FIG. 1. When the tasting glasses of the present invention are used as a set, each glass within the set must have a revealable indicator 12 that is different from every other tasting glass in the set. The revealable indicator may be a letter, number, symbol, picture, or any combination thereof.

Figure 2:
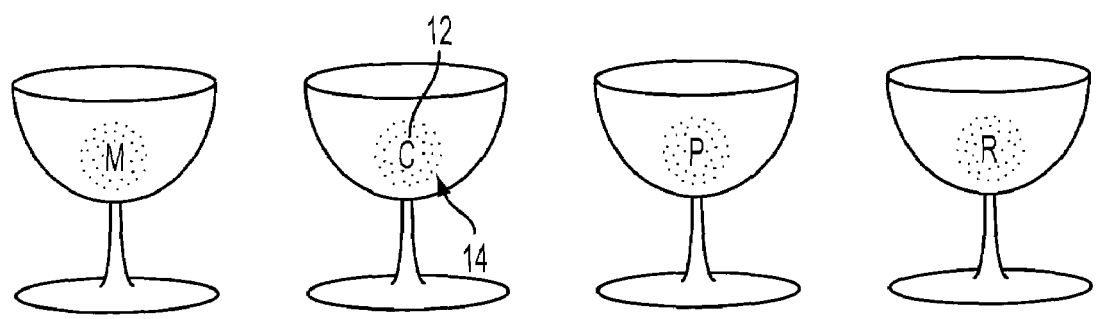
FIG. 2 is a tasting set with revealable indicators revealed.

The revealable indicator is created by etching it into the exterior surface of the tasting glass. The etching must be shallow enough such that the indicator is substantially invisible to the human eye under normal light, temperature and humidity conditions, but becomes visible when condensation 14 forms on the outer surface of the glass. Thus when the outer surface of the tasting glass becomes wet, the indicator 12 is "revealed" to the user of the tasting glass, as shown in FIG. 2.

This shallow etching may be performed using a variety of commonly known glass etching techniques and mediums, including physical abrasion of the glass from sandblasting or chemical abrasion of the glass from commercially available chemical etching creams and solutions. Glass etching has been in practice for hundreds of years; therefore, many such etching techniques and mediums are known to those of skill in the art. Furthermore, those of skill in the art will appreciate the variety of ways these common glass etching techniques can be manipulated to restrict the exposure of the glass surface to the etching medium in order to create the shallow etching effect on the tasting glasses of the present invention.

Any style of glass may be used for the tasting glasses of the present invention. For example, wine glasses, martini glasses, cocktail glasses, liquor glasses, beer glasses, drinking glasses, coffee cups, tea cups or any variety of barware may all be utilized for the tasting glasses of the present invention. However, the tasting glass must be composed of a material that is conducive to the shallow etching necessary to create the revealable indicator on the exterior surface of the tasting glass.

In an exemplary blind tasting conducted using the tasting glasses of the present invention the host first labels each container (e.g., bottle) with a unique indicator corresponding to a unique indicator of one glass of the set of glasses of the present invention. This is done in a manner that does not permit the testing participant(s) to observe which container is labeled with which indicator (e.g., by covering the wine bottles in some manner that prevents the participants from identifying the bottle by sight). Next, the host provides each tasting participant with a set of tasting glasses of the present invention in a manner that permits the host, but not the participant(s), to know which tasting glass has which revealable indicator. Each participant has one tasting glass for each container of beverage to be sampled. The host then pours beverage from each labeled container into the tasting glasses having the identical corresponding revealable indicator. After the participant has sampled the beverage in the tasting glass, he may breathe onto the outer surface of the tasting glass in the area where the revealable indicator is located. The condensation created by the participant breathing onto the outer surface of the tasting glass allows the indicator to be visible to the participant, thereby revealing which beverage he has sampled. The tasting participant then repeats the steps of sampling and revealing for each of the other beverages included in the tasting. Alternatively, the tasting participant may taste the beverage in two or more classes before causing the revealable indicators on the glasses to be revealed.

While the above description is one exemplary embodiment of how the tasting glasses of the present invention may be utilized in a tasting, it should be understood that a wide range of variations in beverage tasting may be performed using the tasting glasses of the present invention. For example, the tasting glasses of the present invention may be utilized for a tasting of any type of beverage, including wine, liquor, beer, coffee, or tea. Additionally, the tasting glasses of the present invention may be utilized in a variety of locations, such as vineyard, distillery or brewery tasting rooms, wine or liquor shops, and private homes.

It should also be understood that a wide range of changes and modifications can be made to the exemplary embodiment of the tasting glasses described above. It is therefore, intended that the foregoing description illustrates rather than limits this invention, and that it is the following claims, including all equivalents, which define the invention.

I claim:

1. A set of two or more tasting glasses comprising:
   a revealable indicator being shallowly etched on each tasting glass such that the etching is substantially invisible to the human eye when the tasting glass is dry;
   wherein the etching is revealable when condensation forms on the surface of the etching; and
   wherein the revealable indicator on each tasting glass is different from the revealable indicator on every other tasting glass in the set.

2. The set of tasting glasses of claim 1 wherein the set includes four to six tasting glasses.

3. The set of tasting glasses of claim 1 wherein the revealable indicator is created by etching the indicator into the outer surface of the tasting glass.

4. The set of tasting glasses of claim 1 wherein the revealable indicator is selected from the group consisting of letters, numbers, symbols, pictures, and combinations thereof.

5. The set of tasting glasses of claim 1 wherein the style of tasting glass is selected from the group consisting of wine glasses, martini glasses, cocktail glasses, liquor glasses, beer glasses, barware, drinking glasses, coffee cups, and tea cups.

6. The set of tasting glasses of claim 1 wherein the tasting glasses include wine.

7. A method of conducting a beverage tasting comprising the steps of:
   a) providing a beverage tasting participant with a set of tasting glasses wherein each tasting glass has a unique revealable indicator, the unique revealable indicator being revealable only by applying condensation to the tasting glass, and wherein the set includes one tasting glass for each container of beverage to be tasted;
   b) associating each of two or more containers of beverage with a unique indicator corresponding to a unique revealable indicator of a tasting glass of the set;
   c) pouring beverage from each container into the tasting glass having a revealable indicator corresponding to the container of beverage associated with that revealable indicator;
   d) permitting the tasting participant to sample the beverage in one or more tasting glasses;
   e) breathing or having a participant breathe onto the outer surface of the tasting glass in the area where the revealable indicator is located to reveal the indicator.

8. The method of claim 7 wherein the beverage is wine.

* * * * *

UNITED STATES PATENT AND TRADEMARK OFFICE
CERTIFICATE OF CORRECTION

PATENT NO. : 7,610,872 B2 Page 1 of 1
APPLICATION NO. : 11/100745
DATED : November 3, 2009
INVENTOR(S) : Roman Coppola It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1245 days.

Signed and Sealed this

Twelfth Day of October, 2010

David J. Kappos
*Director of the United States Patent and Trademark Office*